United States Patent [19]

Ozawa et al.

[11] Patent Number: 5,063,888
[45] Date of Patent: Nov. 12, 1991

[54] EXHAUST CONTROL VALVE SYSTEM FOR PARALLEL MULTI-CYLINDER TWO-CYCLE ENGINE

[75] Inventors: Toshikazu Ozawa; Yu Motoyama, both of Iwata, Japan

[73] Assignee: Yamaha Hatsudoki Kabushiki Kaisha, Iwata, Japan

[21] Appl. No.: 566,968

[22] Filed: Aug. 13, 1990

[30] Foreign Application Priority Data

Aug. 14, 1989 [JP] Japan .................................. 1-207914
Jun. 27, 1990 [JP] Japan .................................. 2-166607

[51] Int. Cl.⁵ ............................................. F02B 33/04
[52] U.S. Cl. .............................. 123/65 PE; 123/73 C; 60/312
[58] Field of Search ............ 123/65 PE, 65 P, 65 PD, 123/65 V, 323, 73 C; 60/312

[56] References Cited

U.S. PATENT DOCUMENTS

| | | | |
|---|---|---|---|
| 4,121,552 | 10/1978 | Mithuo et al. | 123/65 PE |
| 4,399,788 | 8/1983 | Bostelmann | 123/65 PE |
| 4,723,514 | 2/1988 | Taniuchi | 123/65 V |
| 4,776,305 | 10/1988 | Oike | 123/65 PE |
| 4,903,647 | 2/1990 | Yamamoto et al. | 123/323 |
| 4,920,932 | 5/1990 | Schlunke | 123/65 PE |

FOREIGN PATENT DOCUMENTS

| | | | |
|---|---|---|---|
| 0212729 | 9/1988 | Japan | 123/323 |
| 0255512 | 10/1988 | Japan | 123/65 PE |

Primary Examiner—David A. Okonsky
Attorney, Agent, or Firm—Ernest A. Beutler

[57] ABSTRACT

An in-line, two-cycle, crankcase compression, internal combustion engine having a plurality of scavenge ports and an exhaust port for each cylinder in which an exhaust control valve is positioned. To permit a compact assembly, the ports are rotated about the cylinder bore axis in a transverse plane so that the exhaust ports extend at an acute angle to a common plane containing the cylinder bore axes and the control shafts for the exhaust control valves extends perpendicularly to this plane. A wide variety of actuators are disclosed for operating the exhaust control valves simultaneously including flexible transmitters and a linkage system.

45 Claims, 6 Drawing Sheets

EXHAUST CONTROL VALVE SYSTEM FOR PARALLEL MULTI-CYLINDER TWO-CYCLE ENGINE

BACKGROUND OF THE INVENTION

This invention relates to an exhaust control valve system for a parallel multi-cylinder, two-cycle engine and more particularly to an improved exhaust port and control valve arrangement for such an engine that permits a compact assembly.

It is well known that the port timing in two-cycle, crankcase compression, internal combustion engines is very critical to the engine performance. It is also known that port timings that permit maximum power attainment normally provide poor running at low and mid-ranges. In a like manner, port timings that provide good low and mid-speed range running do not permit maximum power output. It has, therefore, been proposed to employ an exhaust control valve in the exhaust port that is effective to change the exhaust timing and permit optimum engine performance through a wider range of running conditions.

With most two-cycle, crankcase compression engines, there are provided a plurality of scavenge ports formed around the cylinder bore axis for transferring the compressed intake charge to the combustion chamber. Normally, there is also provided at least one exhaust port that is somewhat in confronting relationship to the intake ports. The use of such multiple ports, therefore, gives rise to a situation wherein the cylinder bore to cylinder bore spacing must be increased to provide clearance for the individual ports and passages associated with them.

One way that the engine can be made more compact is to rotate the port arrangement relative to the cylinder bore axis so as to permit the ports associated from one cylinder to nest between those of the adjacent cylinder. With inline engines, this will permit a reduction in the overall length of the engine. However, when exhaust control valves have been employed, this rotational positioning of the ports has not been done because of the difficulties in providing the control valves and operating mechanism for them.

It is, therefore, a principal object of this invention to provide an improved port and exhaust control valve arrangement for a two-cycle, crankcase compression, internal combustion engine that provides a compact assembly.

It is a further object of this invention to provide a porting and exhaust control valve arrangement for a two-cycle, crankcase compression engine that permits the ports to be rotated relative to the cylinder bore axis to achieve a compact construction while at the same time insuring ease of operation of the control valves for the exhaust ports.

It is yet another object of this invention to provide an improved exhaust port and control valve arrangement for a multiple cylinder, two-cycle, crankcase compression, internal combustion engine.

SUMMARY OF THE INVENTION

This invention is adapted to be embodied in a multi cylinder, two-cycle, crankcase compression, internal combustion engine having a cylinder block assembly that defines a pair of adjacent cylinder bores. The cylinder bores have their axes lying in a common plane and a crankcase is positioned at one end of the cylinder bores. Scavenge port means comprised of at least one scavenge passage extend from the crankcase to each of the cylinder bores. An exhaust port extends from each of the cylinder bores for discharging exhaust gases from the respective cylinder to the atmosphere. Exhaust control valve means is provided for varying the effective area and timing of operation of the exhaust ports.

In accordance with a first feature of the invention, the exhaust ports are disposed primarily within a quadrant defined by the plane and a plane perpendicular thereto and also extending through the respective cylinder bore axis.

In accordance with another feature of the invention, the exhaust ports are formed at the end of exhaust passages that extend through the cylinder bore for discharging the exhaust gases to the atmosphere. The exhaust passages have a central line that is disposed at an acute angle to the plane so that the exhaust passages are rotated relative to a plane extending through the cylinder bore axis and perpendicular to the first mentioned plane.

DETAILED DESCRIPTION OF THE PREFERRED EMBODIMENTS

Figure 1:
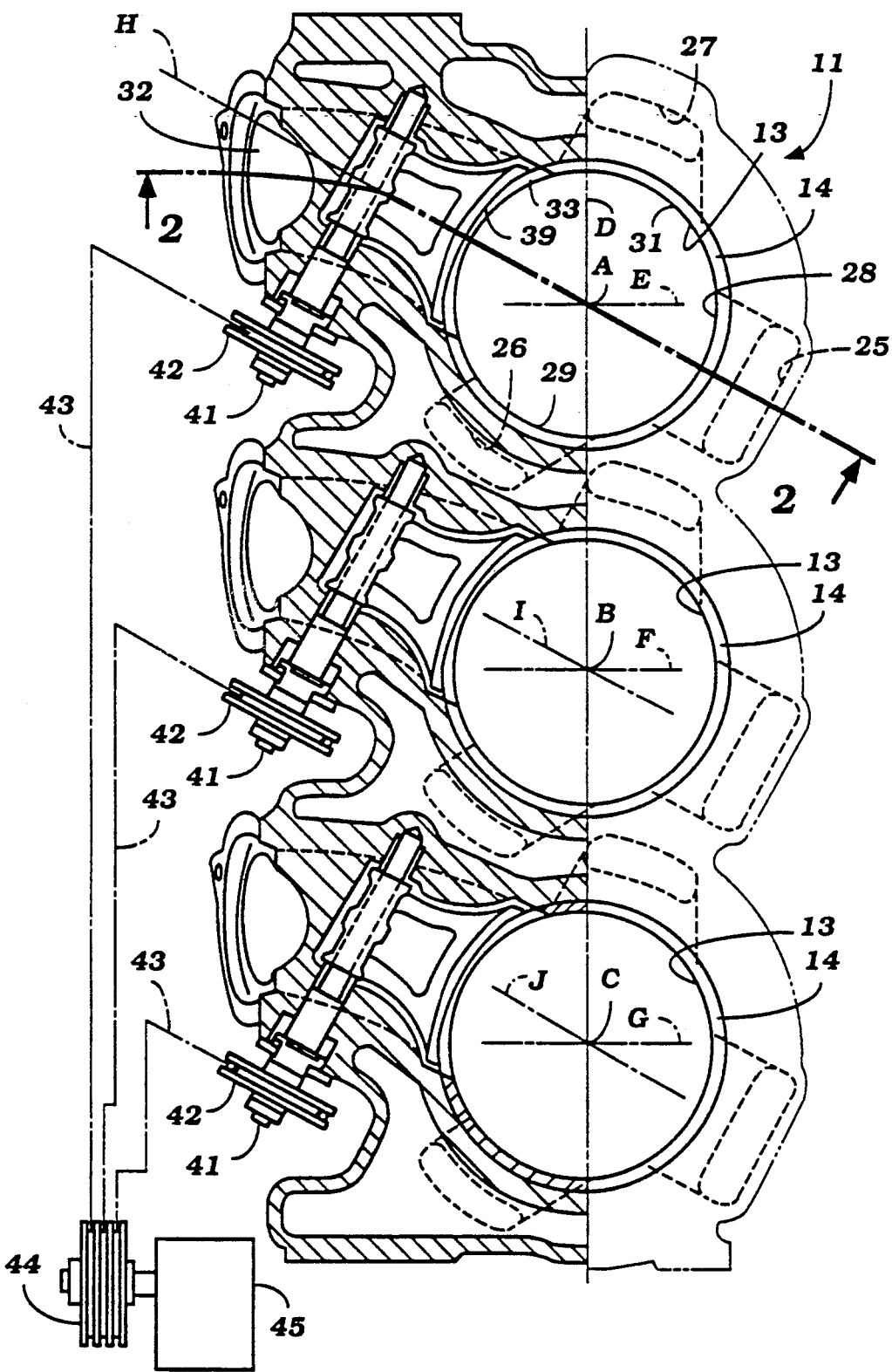
FIG. 1 is a partial cross-sectional view taken through along a plane extending perpendicularly to the cylinder bore axes of a multi-cylinder, two-cycle, crankcase compression engine constructed in accordance with an embodiment of the engine, with the exhaust control valve control mechanism being shown schematically and generally along the line 1—1 of FIG. 2.
Figure 2:
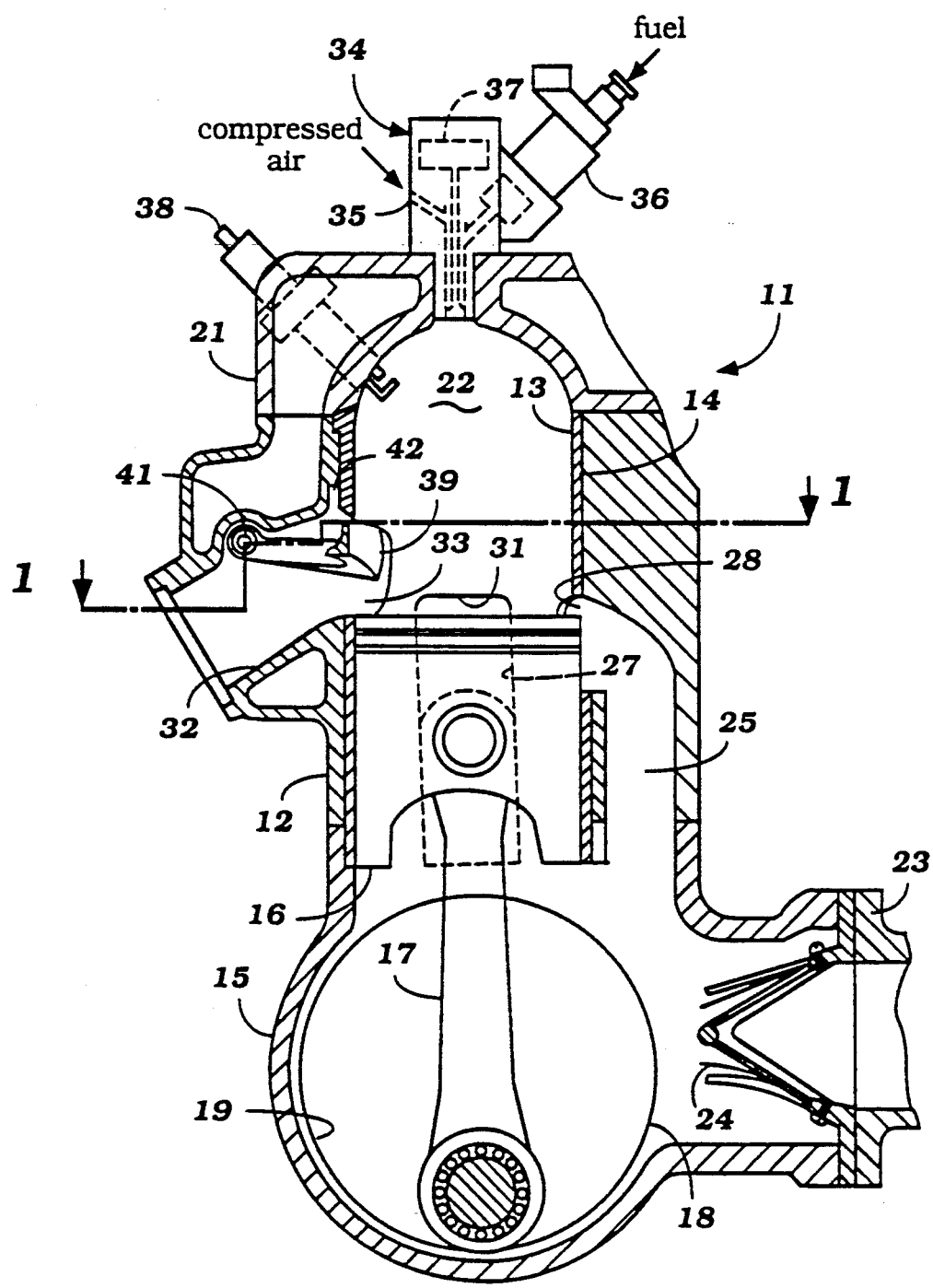
FIG. 2 is a cross-sectional view taken along the line 2—2 of FIG. 1.

Referring first to the embodiment of FIGS. 1 through 4, a two-cycle, crankcase compression, internal combustion engine constructed in accordance with this embodiment of the invention is identified generally by the reference numeral 11. In the illustrated embodiment, the engine 11 is of the three cylinder, in line type. It may be understood that the invention may be practiced in conjunction with engines having other numbers of cylinders and also with engines having V or opposed type configurations and two or more cylinders in each bank. It should be readily apparent to those skilled in the art how this invention can be practiced with such other engine configurations.

The engine 11 includes a cylinder block assembly 12 having three aligned cylinder bores 13 that are formed by pressed-in liners 14. The cylinder bores 13 have their respective axes A, B and C lying in a common plane, indicated by the reference character D in FIG. 1. A crankcase member 15 is affixed, in a known manner, to the lower end of the cylinder block 12 at one end of the cylinder bores 13. Pistons 16 are slidably supported within the cylinder bores 13 and are connected by means of connecting rods 17 to a crankshaft 18 that is journaled for rotation within individually sealed crankcase chambers 19 of the engine about an axis that lies in the plane D. The crankcase chambers 19 are formed between the lower end of the cylinder block 12 and the crankcase member 15 and are each sealed relative to each other, as is conventional with two-cycle engine construction.

A cylinder head, indicated generally by the reference numeral 21, is affixed to the cylinder block 12 at the end opposite the crankcase member 15 and is formed with respective recesses 22 which cooperate with the cylinder bore 13 and pistons 16 to form the combustion chambers of the engine.

A charge forming system is provided for the engine and in accordance with the illustrated embodiments, this charge forming system includes an intake manifold 23 that is affixed to one side of the crankcase member 15 and which communicates with the chambers 19 through reed type check valve assemblies 24 which permits the flow of air into the crankcase chambers 19 but which prevents reverse flow when the piston 16 is compressing the air charge therein. In the embodiments of the invention, only pure air is inducted into the crankcase chambers 19. It is to be understood, however, that the invention can be utilized in conjunction with arrangements wherein a fuel/air charge is admitted to the crankcase chambers 19.

The charge which is admitted to the crankcase chambers 19 and which is compressed, as aforenoted, is transferred from the crankcase chambers 22 through three angularly disposed scavenge passages 25, 26 and 27. Although different number of scavenge passages may be employed, the invention has particular utility in conjunction with engines having a plurality of scavenge passages so that the normal disposition of the scavenge passages could cause an increase in length of the engine. The scavenge passage 25 may be considered to be a center scavenge while the passages 26 and 27 may be considered to be side scavenge passages. In conventional arrangements, the scavenge passages 25 would lie on planes E, F and G which are perpendicular to the plane D and which extend at right angles thereto and which intersect the cylinder bore axes A, B and C. The side passages 26 and 27 would have their centers lying on the plane D. As should be readily apparent from an inspection of FIG. 1, this orientation would cause the engine to have a greater length than with the described embodiment to provide the necessary clearance for adjacent side scavenge passages. However, in accordance with the invention, these passages are rotated about the respective cylinder bore axes A, B and C so that the centers of the side scavenge passages 25 lie on planes H, I and J that are disposed at an acute angle to the planes E, F and G. As a result, it can be clearly seen that a more compact engine is provided by this rotation of the scavenge passages without adversely affecting the flow area.

Each of the scavenge passages 25, 26 and 27 extends from the crankcase chambers 19 and enters the respective combustion chamber 22 through a respective scavenge port 28, 29 and 31. The scavenge ports 28, 29 and 31 subtend an arc that is greater that 180 degrees of the cylinder bore 13.

In confronting relationship to the scavenge passages 25, the cylinder block 12 is provided with exhaust passages 32 which extend from exhaust ports 33 that lie substantially within the quadrant defined by the planes D,E, D,F and D,G. The center of these passages 32 also lies along the planes H, I and J. This further adds in the compaction of the overall engine construction and affords good scavenging.

A fuel/air charge is admitted to each combustion chamber 22 by an air/fuel injector indicated generally by the reference numeral 34 and which has an air injector portion 35 that receives air under pressure from a suitable air compressor (not shown). In addition, a fuel injection nozzle 36 injects fuel with the flow of fuel and air into the combustion chambers 22 being controlled by a suitable valve mechanism operated by a solenoid 37. Since the construction of the fuel/air injector 34 forms no part of the invention and since no other charge forming systems may be employed, further description of it is believe to be unnecessary.

The charge which is admitted to the chamber 22 is fired by a spark plug 38 in a known manner.

As has been previously discussed, it is desirable to provide a fairly substantial overlap in the operation of the scavenge ports 28, 19 and 31 and the exhaust port 33 to provide maximum power output. However, such maximum power output and high overlaps deteriorates the low speed performance. In order to obviate these problems, individual exhaust control valves, indicated generally by the reference numeral 39, are provided in each of the exhaust passages 32 for masking the exhaust ports 33 and changing the effective timing.

Figure 3:
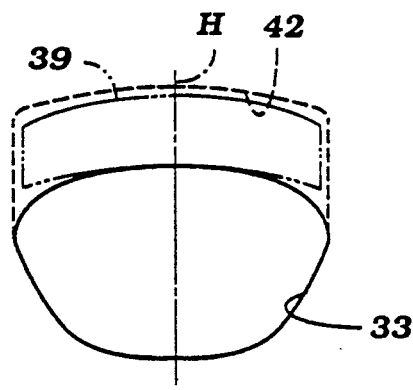
FIG. 3 is a projected view of the exhaust port and shows the cooperation of the exhaust control valve therewith with the engine running at wide open throttle, full speed, full load conditions.
Figure 4:
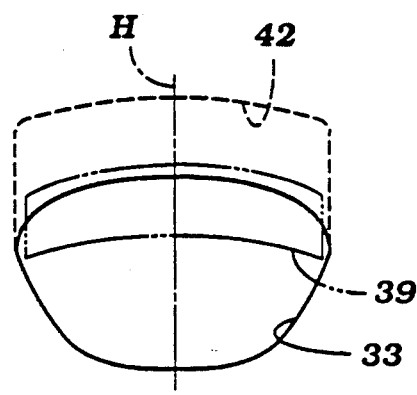
FIG. 4 is a projected view, in part similar to FIG. 3, and shows the mechanism when operating at idle and low speed.

In the illustrated embodiment, the valves 39 are of a type that are affixed to respective valve shafts 41 that extend perpendicularly to the planes H, I and J at the upper end of the passages 32 and which have valve portions that are adapted to pass into a recess 42 formed between the cylinder liner 14 and the cylinder block 12 when the control valves 39 are positioned in their fully opened position as shown in FIG. 3. In this instance, the exhaust port will open as soon as the pistons 16 move downwardly so as to uncover them and there will be a substantial overlap to achieve high power. However, under low speed conditions, the control valves 39 are moved to the position shown in FIGS. 2 and 4 wherein they will partially obscure the exhaust ports 33 and cause a delay in their opening. This will improve significantly low speed running.

Although a variety of arrangements can be employed for operating the control valves 39, it is desirable to insure that they are operated in unison and, as one possible structure for achieving this, there is affixed to the exposed end of each control valve shaft 41 a respective pulley 42. It should be noted that the exposed end of the shafts 41 on which the pulleys 42 are affixed is the end that extends toward the plane E, F and G or the end opposite that of the direction in which the planes H, I and J are rotated. This places the pulleys 42 in a conveniently accessible location and one which is nested between adjacent exhaust ports in the cylinder block so as to make the arrangement more compact and serviceable. A respective wire actuator 43 is connected to each pulley 42 and is, in turn, connected at its other end to a respective pulley or groove 44 of a combined pulley that is affixed to the output shaft of a servo motor 45.

The servo motor 45 is controlled by an appropriate controlled strategy so as to control the timing in relation to engine speed and/or load or other characteristics so as to achieve the aforenoted results.

Figure 5:
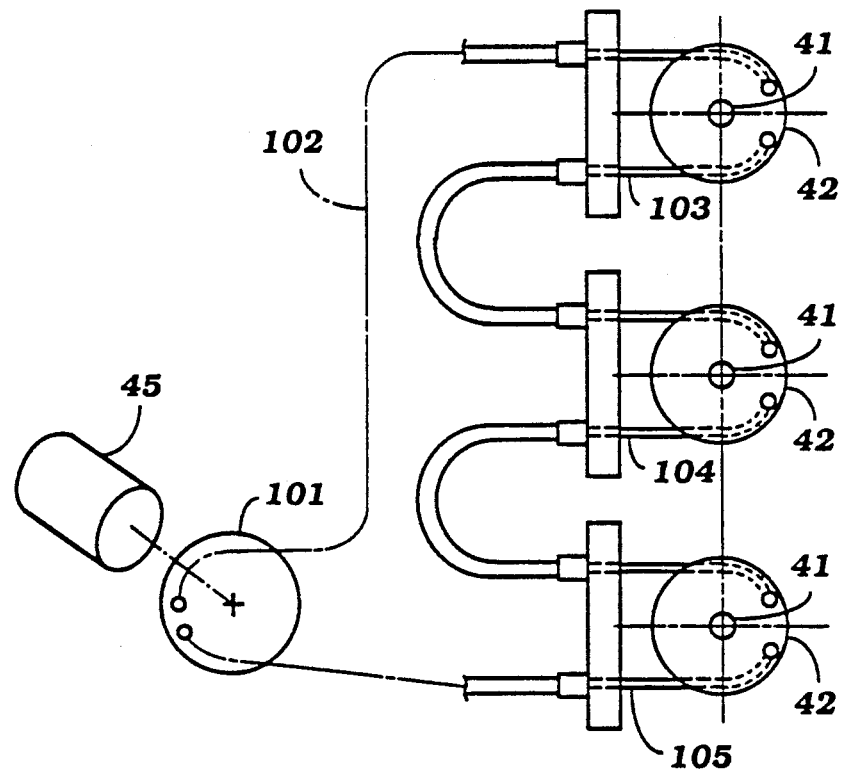
FIG. 5 is a partially schematic view showing another embodiment for operating the control valves.

FIG. 5 shows another arrangement for operating the exhaust control valves 39 all in unison. Because the basic construction of this embodiment is the same as the previously described embodiment, only the control valve actuating mechanism is illustrated since the basic porting arrangement is the same as that already described. In addition, this embodiment also employs as actuators, pulleys 42, that are affixed to the control valve shafts 41 and which are associated with a servo motor 45. In this embodiment, however, a series chain of remote control wire actuators is interlinked between a pulley 101 that is affixed to the output shaft of the servo motor 45 and includes a first wire actuator 102 that extends from the pulley 101 to the pulley 42 of on of the control valve shafts 41. A second wire actuator 103 extends from the other side of this first pulley 42 to the pulley 42 of the central throttle control valve shaft 41. A third wire actuator 104 extends from the other side of this pulley 42 to the remaining pulley 4 of the remaining throttle control valve shaft 41. This final pulley is then connected by means of a fourth wire actuator 105 back to the pulley 101 of the servo motor 45. As a result, operation of the pulley 101 will achieve simultaneous movement of all of the exhaust control valve shafts 41.

Figure 6:
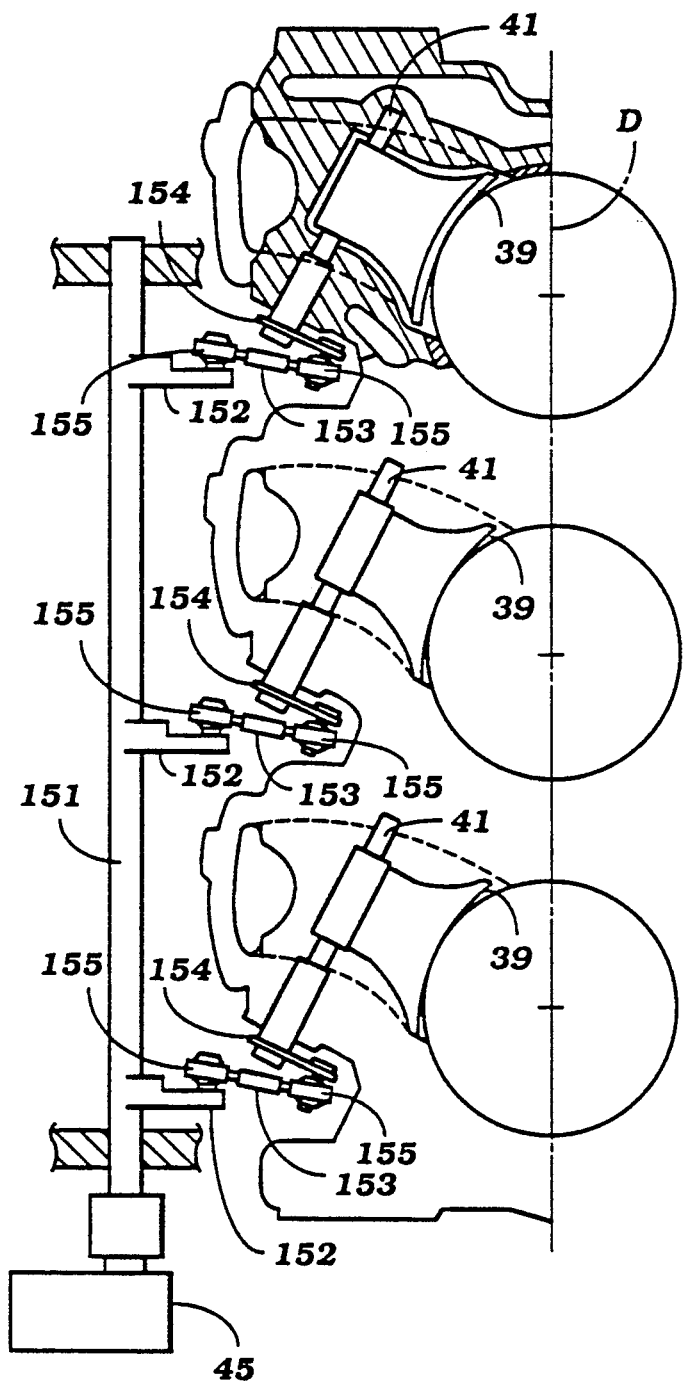
FIG. 6 is a partial cross-sectional view, in part similar to FIG. 1, and shows yet another embodiment of the invention.

FIG. 6 shows another embodiment of the invention which is basically the same as the embodiment of FIGS. 1 through 4 and differs from that embodiment and that of FIG. 5 only in the manner in which the control valve shafts 41 are operated. Because of these similarities, the basic construction of the engine, the exhaust control valves and the exhaust control valve shafts 41 will not be described again. The description will be limited solely to the method and structure for operating the exhaust control valves 39 and exhaust control valve shafts 41.

In this embodiment, the servo motor 45 couples an actuating shaft 151 that is rotatably journaled within the cylinder block 12 about an axis that lies parallel to the plane D and which is angularly disposed to the axes of rotation of the control valve shafts 41. A plurality of lever arms 152 are formed either integrally with or affixed to the shaft 151 and have spherical pivotal connections to adjustable length links 153. The opposite end of each of the links 153 is pivoted by means of a spherical pivotal connection to a lever 154 that is affixed to the respective exhaust control valve shaft 41. The spherical connection of the adjustable length links is indicated by the reference numerals 155. As a result, rotation of the shaft 151 will effect simultaneous rotation of the shafts 41 and exhaust control valves 39.

Figure 7:
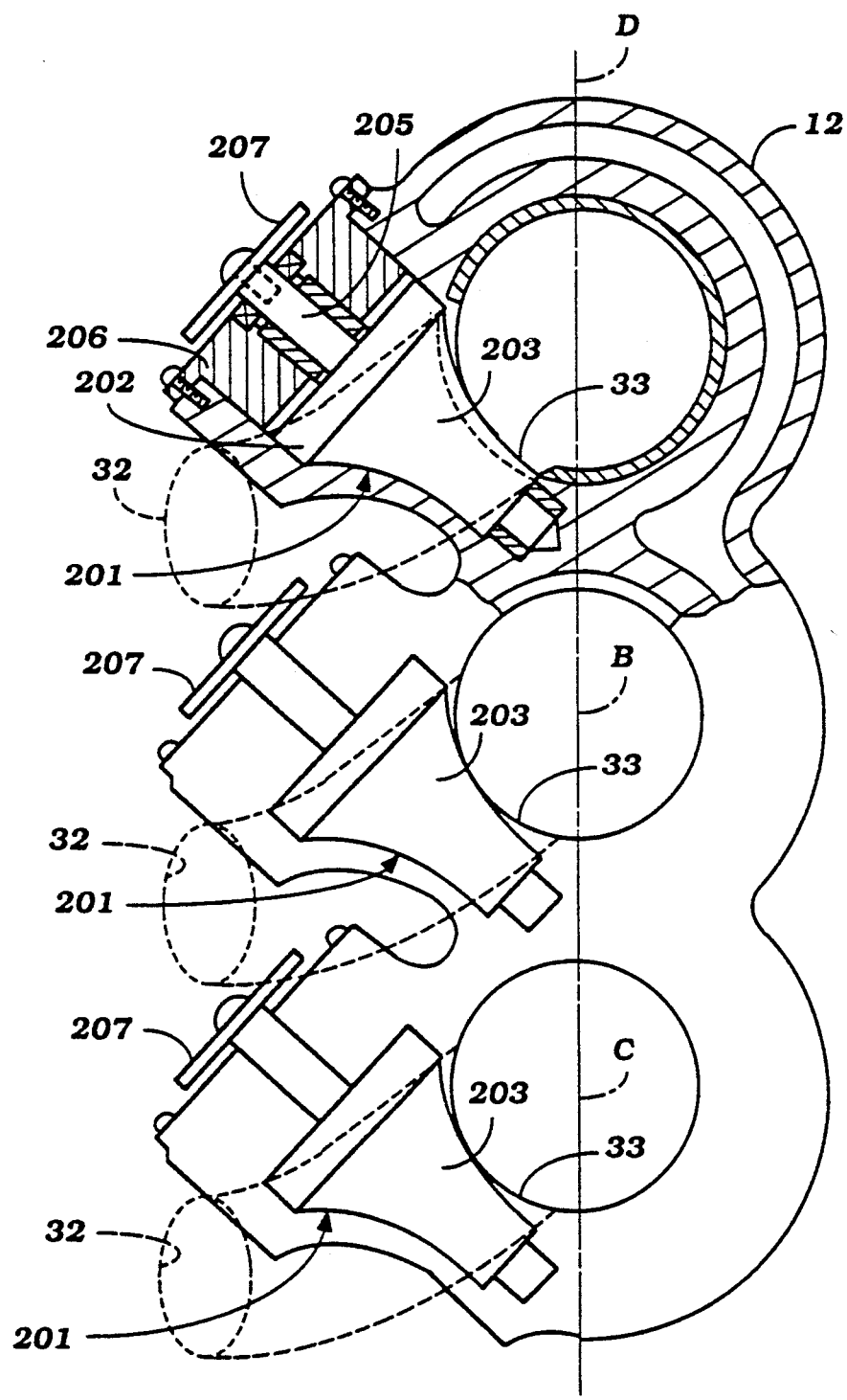
FIG. 7 is a partial cross-sectional view, in part similar to FIG. 1, and shows yet another embodiment of the invention.
Figure 8:
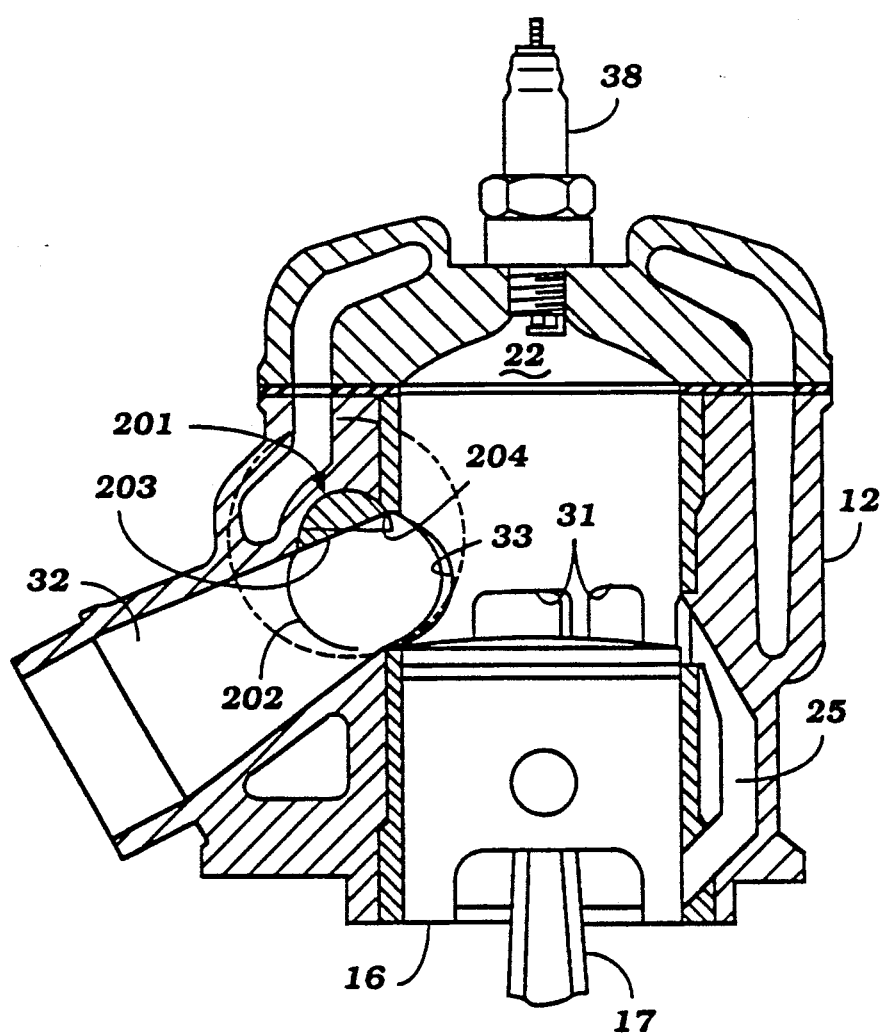
FIG. 8 is a partial cross-sectional view, in part similar to FIG. 2, showing this embodiment of the invention.

In the embodiments of the invention as thus far described, the exhaust control valves 39 have been flap type valves. The invention can also be employed in connection with rotary type valves and FIGS. 7 and 8 show such an embodiment. In this embodiment, the basic construction of the enqine 11 is the same as that previously described and, for that reason, components of this embodiment which are the same as the previously described embodiment have been identified by the same reference numerals and further description of components which are the same or substantially the same of the previously described embodiment are believed to be unnecessary.

In this embodiment, the exhaust passages 32 are rotated from the planes E, F and G in a counterclockwise direction rather than the clockwise direction of the previously described embodiments. However, the axes of the central portions of the exhaust passages 32 lie within the quadrant defined by the planes E, F and G and the plane D. Also, there is an acute angle between the planes as with the aforenoted embodiment but on the opposite side thereof.

In this embodiment, control valves, indicated generally by the reference numeral 201, are rotatably journaled within the cylinder block 12 for controlling the effective opening of the exhaust ports 33 and the timing relationship thereof. In this embodiment, each control valve 201 has a cylindrical portion 202 that is disposed at one side of the ports 33 within the passages 32. Adjacent this cylindrical portion 202, the valves 201 are provided with a semicircular portion 203 which has a flat cutout edge 204 that actually forms a valving member with the port 33. As may be seen in the solid line view of FIG. 8, when the valves 201 are rotated to their fully opened positions, the flat edge 204 merely forms an extension of the passage 32 and the flow through the exhaust ports 33 will not be obstructed and will occur at a position relatively close to top dead center of the piston 16. However, when the valves 201 are rotated to their timing position as shown in phantom in FIG. 8, the opening of the exhaust port 33 will be delayed with the aforenoted results.

Each of the valves 201 further includes a control shaft portion 205 that is journaled within a closure plate 206 affixed to the side of the cylinder block. A control disk or pulley 207 is affixed to the exposed end of each shaft 206 and may be operated in any of the aforedescribed manners. That is, the valves 201 may be operated all by individual flexible transmitters as in the embodiment of FIGS. 1 through 4, by a series train of flexible transmitters as the embodiment of FIG. 5 or by a linkage system as with the embodiment of FIG. 6.

It should be readily apparent from the foregoing description that the embodiments of the invention as described are all capable of providing good running under a wide variety of conditions through the control of the timing of the opening of the exhaust port and the area thereof. This can also be done with a very compact engine assembly due to the rotation of the exhaust ports from a plane perpendicular to the plane containing the axes of the cylinder bores. In addition, in the embodiments, the control valves are all supported for rotation about axes that extend generally perpendicularly to the exhaust passages.

Although a number of embodiments of the invention are illustrated and described, it should be readily apparent that various changes and modifications may be made without departing from the spirit and scope of the invention, as defined by the appended claims.

We claim:

1. A multi-cylinder, two-cycle, crankcase compression, internal combustion engine comprising a cylinder block assembly defining a pair of adjacent cylinder bores having their axes lying in a common plane, a crankcase at one end of said cylinder block, scavenge port means comprising at least one scavenge passage extending from said crankcase to a respective one of said cylinder bores, an exhaust port extending from each of said cylinder bores or discharge of exhaust gases from the respective cylinder bore to the atmosphere, each of said exhaust ports being disposed primarily within the same quadrant defined by said plane and a plane perpendicular thereto and also extending through the respective cylinder bore axis, an exhaust control valve means for varying the effective area and timing of opening of said exhaust ports.

2. An engine as set forth in claim 1 wherein the exhaust control valve means comprises a valve supported for rotary movement in an exhaust passage associated with the exhaust port for varying the effective area and timing of opening of the individual exhaust ports.

3. An engine as set forth in claim 2 wherein the valves are each rotatable about an axis that extends perpendicularly to a plane passing through the center of the exhaust port and containing the respective cylinder bore axis.

4. An engine as set forth in claim 3 wherein the exhaust valves for each of the cylinders are operated by a common actuator.

5. An engine as set forth in claim 4 further including flexible transmitter means for transmitting motion from the common actuator to each of the exhaust valves.

6. An engine as set forth in claim 5 wherein the flexible transmitter means comprises a plurality of separate flexible transmitters each extending form the control member to a respective one of the exhaust valves.

7. An engine as set forth in claim 5 wherein the flexible transmitter means comprises a plurality of flexible transmitters extending in series relationship from the common actuator to one of the exhaust valves from the one exhaust control valve to the another exhaust valve and back from the other exhaust valve to the common actuator.

8. An engine as set forth in claim 4 further including linkage means for connecting the common actuator to the exhaust valves.

9. An engine as set forth in claim 2 wherein the exhaust valves comprises flap type valves.

10. An engine as set forth in claim 2 wherein the exhaust valves comprise rotary type valves.

11. An engine as set forth in claim 1 wherein the scavenge port means comprises a plurality of scavenge ports spaced circumferentially around each of the cylinder bores.

12. An engine as set forth in claim 11 wherein one of the scavenge passages is in confronting relationship to the exhaust port.

13. An engine as set forth in claim 1 wherein each exhaust port serves a respective exhaust passage extending through the cylinder block and having its center axis lying in a plane that is disposed at an acute angle to the first plane and the perpendicular plane and containing the respective cylinder bore axis.

14. A multi-cylinder, two-cycle, crankcase compression, internal combustion engine comprising a cylinder block assembly defining a pair of adjacent cylinder bores having their axes lying in a common plane, a crankcase at one end of said cylinder block assembly, scavenge port means comprising at least one scavenge passage extending from said crankcase to a respective one of said cylinder bores, an exhaust passage extending from each of said cylinder bores for discharge of exhaust gases from the respective cylinder bore to the atmosphere, each of said exhaust passages having their center line lying in a plane containing the axis of the respective bore and disposed at an acute angle measured in the same direction to the common plane, and exhaust control valve means for varying the effective area and timing of opening of said exhaust passages.

15. An engine as set forth in claim 14 wherein the exhaust control valve means comprises a valve member supported for rotary movement in each exhaust passages for varying the effective area and timing of opening of the individual exhaust passages.

16. An engine as set forth in claim 15 wherein the valve members are rotatable about axes that extend perpendicularly to a plane passing through the center line of the respective exhaust passages and containing the respective cylinder bore axis.

17. An engine as set forth in claim 16 wherein the valve members for each of the cylinders are operated by a common actuator.

18. An engine as set forth in claim 17 further including flexible transmitter means for transmitting motion from the common actuator to each of the exhaust valve members.

19. An engine as set in claim 18 wherein the flexible transmitter means comprises separate flexible transmitters each extending from the control member to a respective one of the exhaust valve members.

20. An engine as set forth in claim 18 wherein the flexible transmitter means comprises a plurality of flexible transmitters extending in series relationship from the common actuator to one of the exhaust valve members, from the one exhaust valve member to another exhaust valve member and back from the other valve member to the common actuator.

21. An engine as set forth in claim 17 further including linkage means for connecting the common actuator to the exhaust valve members.

22. An engine as set forth in claim 15 wherein the exhaust valve members comprises flap type valves.

23. An engine as set forth in claim 15 wherein the exhaust valve members comprise rotary type valves.

24. An engine as set forth in claim 14 wherein the scavenge port means comprises a plurality of scavenge ports spaced circumferentially around each of the cylinder bores.

25. An engine as set forth in claim 24 wherein one of the scavenge ports is in confronting relationship to the exhaust passage.

26. An engine as set forth in claim 25 wherein each exhaust passage extends from a respective exhaust port 27. An engine as set forth in claim 3 further including actuating means affixed to each end of a respective shaft defining the rotational axis of the respective valve and disposed at the end of said shaft adjacent the perpendicular plane.

28. An engine as set forth in claim 27 wherein the actuating means for the exhaust valves for each of the cylinders are operated by a common actuator.

29. An engine as set forth in claim 28 further including flexible transmitter means for transmitting motion from the common actuator to the actuating means of each of the exhaust valves.

30. An engine as set forth in claim 29 wherein the flexible transmitter means comprise a plurality of separate flexible transmitters each extending form the control member to a respective one of the actuating means of the exhaust valves.

31. An engine as set forth in claim 19 wherein the flexible transmitter means comprises a plurality of flexible transmitters extending in series relationship from the common actuator to the actuating means one of the exhaust valves from the actuating means of the one exhaust control valve to the actuating means of another exhaust valve and back from the actuating means other exhaust valve to the common actuator.

32. An engine as set forth in claim 28 further including linkage means for connecting the common actuator to the exhaust valves.

33. An engine as set forth in claim 27 wherein the exhaust valves comprise flap type valves.

34. An engine as set forth in claim 27 wherein the exhaust valves comprise rotary type valves.

35. An engine as set forth in claim 16 further including actuating means affixed to each end of a respective shaft defining the rotational axis of the respective valve and disposed at the end of said shaft adjacent the perpendicular plane.

36. An engine a set forth in claim 35 wherein the actuating means of the exhaust valves for each of the cylinders are operated by a common actuator.

37. An engine as set forth in claim 36 further including flexible transmitter means for transmitting motion from the common actuator to the actuating means of each of the exhaust valves.

38. An engine as set forth in claim 37 wherein the flexible transmitter means comprises a plurality of separate flexible transmitters each extending form the control member to a respective one of the actuating means of the exhaust valves.

39. An engine as set forth in claim 37 wherein the flexible transmitter means comprises a plurality of flexible transmitters extending in series relationship from the common actuator to the actuating means one of the exhaust valves from the actuating means of the one exhaust control valve to the actuating means of another exhaust valve and back from the actuating means other exhaust valve to the common actuator.

40. An engine as set forth in claim 36 further including linkage means for connecting the common actuator to the exhaust valves.

41. An engine as set forth in claim 36 wherein the exhaust valves comprise flap type valves.

42. An engine as set forth in claim 36 wherein the exhaust valves comprise rotary type valves.

43. A multi-cylinder, two-cycle, crankcase compression, internal combustion engine comprising a cylinder block assembly defining a pair of adjacent cylinder bores having their axes lying in a common plane, a crankcase at one end of said cylinder block, scavenge port means comprising at least one scavenge passage extending from said crankcase to a respective one of said cylinder bores, an exhaust port extending form each of said cylinder bores for discharge of exhaust gases from the respective cylinder bore o the atmosphere, said exhaust ports being disposed primarily within a quadrant defined by said plane and a plane perpendicular thereto and also extending throughout the respective cylinder bore axis, an exhaust control valve means for varying the effective are and timing of opening of said exhaust ports, said exhaust control valve means comprising a plurality of exhaust valves each supported for rotary movement in an exhaust passage associated with the respective exhaust port for varying the effective area and timing of opening of the individual exhaust ports about an axis that extends perpendicularly to a line passing through the center of the exhaust port and the respective cylinder bore axis, a common actuator for all of said exhaust valves, and flexible transmitter means of transmitting motion from said common actuator to each of said exhaust valves.

44. An engine as set forth in claim 43 wherein the flexible transmitter means comprises a plurality of separate flexible transmitters each extending form the control member to a respective one of the exhaust valves.

45. An engine as et forth in claim 43 wherein the flexible transmitter means comprises a plurality of flexible transmitters extending in series relationship form the common actuator to one of the exhaust valves from the one exhaust control valve to the another exhaust valve and back from the other exhaust valve to the common actuator.

* * * * *

UNITED STATES PATENT AND TRADEMARK OFFICE
CERTIFICATE OF CORRECTION

PATENT NO. : 5,063,888

DATED : November 12, 1991

INVENTOR(S) : Ozawa, et al

It is certified that error appears in the above-identified patent and that said Letters Patent is hereby corrected as shown below:

Column 8, line 18, Claim 19, after "set" insert --forth--.

Column 8, line 45, Claim 26, after "port" insert --opening into the respective cylinder bore and having its center lying on a plane that is disposed at an acute angle to the common plane and which contains the respective cylinder bore axis.--.

Column 8, line 59, Claim 30, "comprise" should be --comprises--.

Column 9, line 16, Claim 36, "a" should be --as--.

Column 9, line 17, Claim 36, "of" (first occurrence) should be --for--.

Column 10, line 10, Claim 43, "form" should be --from--.

Column 10, line 12, Claim 43, "o" should be --to--.

Column 10, line 15, Claim 43, "throughout" should be --through--.

Column 10, line 17, Claim 43, "are" should be --area--.

Column 10, line 33, Claim 45, "et" should be --set--.

Column 10, line 35, Claim 45, "form" should be --from--.

Signed and Sealed this

Twenty-fourth Day of August, 1993

*Attest:*

BRUCE LEHMAN

*Attesting Officer*       *Commissioner of Patents and Trademarks*